Jan. 10, 1967 G. A. MOYER ETAL 3,297,566
GAS OIL REFLUX CONTROLLER
Filed Oct. 1, 1964

INVENTORS
G. A. MOYER
J. T. CABBAGE
BY
*Young, Dugg*
ATTORNEYS

United States Patent Office 3,297,566
Patented Jan. 10, 1967

3,297,566
GAS OIL REFLUX CONTROLLER
Golden A. Moyer and John T. Cabbage, Bartlesville, Okla., assignors to Phillips Petroleum Company, a corporation of Delaware
Filed Oct. 1, 1964, Ser. No. 400,831
5 Claims. (Cl. 208—355)

This invention relates to fractional distillation control. In one of its aspects it provides a method for regulating a flow of a product from a fractionator comprising removing a product stream from a fractionator tray at a controlled rate, withdrawing a side stream below the point of withdrawal of said product stream, passing said side stream to a liquid-vapor separator, separating the liquid from the vapor in said side stream, maintaining a level of liquid in said liquid-vapor separator, passing said liquid from said liquid-vapor separator back to the fractionator at a controlled rate, measuring the level of said liquid in said liquid-vapor separator, and controlling the rate at which said product stream flows from said fractionator responsive to said level of said liquid in said liquid-vapor separator. In another aspect, the product stream is passed to a stripper vessel, the vapor is stripped from the liquid product in the stripper vessel, a level of liquid is maintained in said stripper vessel, the level of liquid is sensed in said stripper vessel, and the rate at which the product stream flows to the stripper vessel is controlled in accordance with the level of liquid in the stripper vessel. In a still further aspect of the invention, a signal is generated by the sensed level of liquid in the liquid-vapor separator for the side stream and the signal is used to reset the rate of flow control of the product stream from the fractionator. In a still further aspect, there is provided an apparatus for carrying out the method of the invention.

In fractional distillation operations, it is desirable to draw off products of a particular boiling range from various places along the column. In taking a product from a fractional distillation column, it is necessary to control the rate of product removal so that the fractionator trays below the point at which the product is being removed will have the desired amount of liquid thereon. If too much product is drawn off, the fractionator trays below the point of withdrawal become dry and will lose their effectiveness in the fractionation process. If not enough product is withdrawn, the fractionator trays below the point of withdrawal may become flooded, causing inefficient operation of the fractionator. This is a difficult problem to control because the operator cannot tell how much liquid, if any, is accumulating on the fractionator trays. Further, changes in the composition of the feed will cause a corresponding change in the volumes of hydrocarbon fraction accumulating on the trays. Heretofore, no method has been proposed which allows control of the amount of liquid on the fractionator trays while removing a maximum of a side stream product at the desired quality from the fractionator.

Therefore, it is an object of this invention to provide a method for controlling the rate at which a product stream is taken from a fractionator so that a maximum amount of product at the desired quality is withdrawn from the fractionator and the fractionator trays below the point of withdrawal of the product have a sufficient amount of liquid on them. It is a further object of this invention to provide a method for automatically changing the rate of product withdrawal from a fractionator according to changes in the composition of the feed to the fractionator. It is a further object of this invention to provide a method for removing a product stream from a fractionator so that a minimum volume of liquid is present on the trays. It is a still further object of this invention to provide an apparatus for removing a maximum amount of product at the desired quality from a fractionator while maintaining a minimum amount of liquid on the fractionator trays below the locus of gas oil product withdrawal.

Other aspects, objects, and the several advantages of the invention will be apparent to one skilled in the art from the specification, drawing, and the appended claims.

According to the invention, there is provided a method for removing a product from a fractionator, said method comprising removing, at a controlled rate, a liquid condensate from a fractionator tray at a point above the point of entry of the feed to said fractionator, removing from said fractionator a second stream of liquid from a fractionator tray which tray is above said point of entry of the feed but below said point where said liquid condensate is removed from said fractionator, passing said second liquid stream to a liquid-vapor separator, removing the lower boiling products from said second stream in said liquid-vapor separator, removing vapor from said liquid-vapor separator and passing said vapor back into said fractionator, maintaining a liquid level in said liquid separator, removing the liquid from said liquid-vapor separator, and passing said liquid at a predetermined rate back into said fractionator at a point below said point of entry of the feed, sensing the liquid level in said liquid-vapor separator, and controlling the rate of removal of said liquid condensate from the fractionator according to the sensed liquid level in said liquid-vapor separator.

Further, according to the invention, there is provided an apparatus for carrying out the process of the invention. More specifically, the apparatus comprises a fractionator operatively connected to a liquid-vapor separator at or near the point of feed introduction into the fractionator. Further, there is provided a means for passing liquid from the side stripper back into the fractionator at a controlled rate. There is also provided a means for sensing a liquid level in the liquid-vapor separator and means for controlling the withdrawal of a product stream from the fractionator, according to the sensed liquid level. Further, the apparatus can provide a side stream stripper to separate light components from liquid in the product stream liquid.

The invention can best be understood by reference to the accompanying drawing. FIGURE 1 shows an embodiment of the invention as applied to the bottom portion of a fractionator.

A crude oil which is partially vaporized enters fractionator 2 by way of conduit 1. The crude oil is charged into vapor space 3. Trays I, II, III, IV, V and VI below the feed entry make up the stripping section of the fractionator. Trays VII, VIII, IX, X, XI, XII, XIII are a portion of the trays located above the feed. Tray XII is a doughnut-type tray with downcomer 5 to discharge liquid onto the tray XI below. The location of the overflow or upper portion of downcomer 5 prevents removal of all of the liquid from tray XII flowing down onto tray XI. A liquid hydrocarbon product is removed from fractionator tray XII through line 7 and into gas oil stripper 8. Steam is supplied to the gas oil stripper 8 through line 11 and the vaporous product is removed through line 12 and passed back into fractionator 2. The liquid level in the gas oil stripper is sensed by liquid level controller 9 and the signal therefrom is used to control the flow of product into the stripper by controlling valve 10. The hydrocarbon product is removed from stripper 8 via line 13 at a rate controlled by flow recorder controller 20 and valve 21. A second side stream is withdrawn from the fractionator through line 14 and passed into liquid-vapor separator 15 wherein vapors are separated from liquid. Vapors can be returned to the fractionator through line 22 while liquid is removed from the separator through line 16 at a predetermined rate determined by the flow recorder controller 17 and valve 18. Liquid level controller 19 senses the level of liquids in separator vessel 15 and transmits a signal to flow recorder controller 20. According to the invention, the signal from the liquid level controller 19 will be used by the flow recorder controller as a reset signal to adjust the rate of flow from vessel 8 through line 13.

According to the invention there is produced by way of conduit 13 the maximum available quantity of gas oil having some preselected quality, e.g., a predetermined maximum allowable carbon residue content.

In order to insure that this quality limitation is met, trays VII through XI must have liquid thereon to remove any entrained feed materials (carbon residue producing materials) from the rising vapors which, in part, produce the liquid distillate gas oil recovered by way of conduits 7 and 13.

Liquid distillate withdrawn from total trapout tray VII by way of conduit 14, having been condensed in the fractionator at and above tray VII is charged to keg 15 and returned to the fractionator 2 by way of conduit 16 for stripping thereof. The liquid passed through conduit 16 is moved at a preselected constant rate of flow, as controlled by flow control unit 17 and control valve 18. Since the vapor flow in 22 is relatively minor, conduit 14 flows liquid into vessel 15 at approximately the same rate that the liquid is removed therefrom at constant rate by way of conduit 16. However, a change in the fractionator, e.g., due to change in quality and/or quantity of the feed thereto, can upset the system. For example, less liquid can flow by way of 14 into keg 15. Since liquid is removed from keg 15 by way of conduit 16 at a constant rate, the liquid level in keg 15 tries to lower. As this level tries to lower, lever control unit 19 resets flow controller 20 to a lower flow rate demand which in turn causes a pinching down on valve 21 in conduit 13 (which conduit removes liquid gas oil from the system). As a valve 21 is pinched back, the liquid level in vessel 8 tries to rise. This attempted level rise is sensed by level control unit 9 which causes a pinching down on valve 10 in conduit 7 (which conduit removes liquid gas oil from fractionator total trapout tray XII). Since less gas oil is now being removed from tray XII, additional gas oil flows down through downspout 5 and onto the trays therebelow ultimately flowing from trapout tray VII into conduit 14 and thence into keg 15 to bring the liquid in keg 15 back to the preselected level, which is desired. The operation, as above described, insures that trays VII through XII are wet with liquid so that no entrained feed is removed with the gas oil in conduit 7, and insures that the maximum production of gas oil is attained.

It is not intended that the figure be a limitation on the invention. For example, the invention could conceivably be practiced without the use of the stripper vessel 8.

*Typical operation*

Crude oil (Western Kansas) (1):
- Volume (as liquid) barrels/day _____ a 60,000
- Temperature, ° F. _____ 775
- API @ 60° F. _____ 40.0

Gas oil draw (7):
- Volume, barrels/day _____ 13,500
- Temperature, ° F. _____ 680
- API @ 60° F. _____ 30.6
- C.O.C. flash point, ° F. _____ 250

Stripping steam (11):
- Pounds/hour _____ 7,000

Gas oil product (13):
- Volume, barrels/day _____ 13,000
- Temperature, ° F. _____ 665
- API @ 60° F. _____ 30.4
- C.O.C. flash point, ° F. _____ 310 a 75 percentage vapor.

Heavy gas oil (16)
- Volume, barrels/day _____ 1,200
- Temperature, ° F. _____ 755
- API @ 60° F. _____ 17.3

Topped crude oil:
- Volume, barrels/day _____ 15,000
- Temperature, ° F. _____ 730
- API @ 60° F. _____ 15.0

Fractionator (2):
- Top temperature, ° F. _____ 265
- Top pressure, p.s.i.g. _____ 10
- Bottom temperature, ° F. _____ 730
- Bottom pressure, p.s.i.g. _____ 16

Stripper (8):
- Bottom temperature, ° F. _____ 665
- Pressure, p.s.i.g. _____ 15

Separator (15):
- Temperature, ° F. _____ 755

Reasonable variation and modification are possible within the scope of the foregoing disclosure, drawings, and appended claims to the invention, the essence of which is that the rate at which a product is withdrawn from a fractionator is controlled by removing a side stream from the fractionator below a point at which the product stream is withdrawn from the fractionator and passing the side stream to a liquid-vapor separator wherein liquid is separated from vapor, and a liquid level is maintained therein, the liquid is passed back to the fractionator at a predetermined rate, the level of liquid is sensed in the liquid-vapor separator and the signal from the liquid level controller is used to adjust the rate at which the product is withdrawn from the fractionator.

We claim:

1. In a fractionation process wherein a first side stream is drawn off at a variable rate for a product and liquid is maintained on fractionation trays between the locus of said product removal and the locus of feed entry into a fractionator, the locus of said product removal being above the locus of said feed entry, the improvement which comprises removing a second stream from a fractionator tray in said locus of feed entry, passing at least a portion of said second stream to a separator wherein vapors are separated from liquid, maintaining a liquid level in said separator, passing liquid in said separator at a fixed rate from said separator back into said fractionator, and controlling the rate at which said first side stream is drawn off responsive to the liquid level in said separator to maintain a maximum amount of product withdrawal through said first side stream while maintaining a controlled amount of liquid in the fractionator between the locus of feed entry and the locus of product removal.

2. A method for drawing a maximum amount of a product from a fractionator while maintaining a controlled amount of liquid on the fractionator trays comprising removing a liquid condensate from a fractionator tray at a point above the point of entry of the feed to said fractionator, passing said liquid condensate to a stripper vessel, removing vaporous components of said liquid condensate from said stripper vessel, removing liquid now stripped of vapors from said stripper vessel at a controlled rate, removing from said fractionator a second stream of liquid from a fractionator tray above said point of entry of the feed but below said point where said liquid condensate is removed from said fractionator, passing said second stream to a liquid-vapor separator, removing lower boiling products from said second stream in said liquid-vapor separator, passing said products back into said fractionator, maintaining a liquid level in said liquid-vapor separator, removing the liquid from said liquid-vapor separator, passing said liquid removed from said liquid-vapor separator at a predetermined rate back into said fractionator at a point below said point of entry of said feed, sensing the liquid level in said liquid-vapor separator, and adjusting the flow of liquid from said stripper vessel according to the sensed level of liquid in said liquid-vapor separator.

3. A method according to claim 2 wherein a level of liquid is maintained in said stripper vessel, said level of liquid in said stripper vessel is sensed, and the rate at which said liquid condensate is passed into said stripper vessel is controlled in accordance with the sensed level of liquid in the stripper vessel.

4. A fractionation system for withdrawing a maximum amount of a product while maintaining a controlled amount of liquid on fractionator trays comprising, means for supplying crude oil to said fractionation column, means for vaporizing said crude oil, means for condensing and collecting a hydrocarbon product in said column, means for removing said hydrocarbon product at a controlled rate, means below said means for condensing and collecting said hydrocarbon product in said column for condensing a higher boiling point hydrocarbon, means for removing said higher boiling point hydrocarbon, means for passing said higher boiling point hydrocarbon to a liquid-vapor separator, a liquid-vapor separator, means for maintaining a level of liquid in said liquid-vapor separator, means for returning a portion of said liquid in said liquid-vapor separator to the column at a predetermined rate, means for sensing the level of liquid in said liquid-vapor separator, and means for controlling the flow of hydrocarbon product from said column according to the level of liquid sensed in said liquid-vapor separator.

5. An apparatus according to claim 4 wherein there is provided means for stripping the vaporous product from said hydrocarbon product, means for passing said hydrocarbon product to said stripping means, means for maintaining a level of liquid in said stripping means, means for sensing the level of liquid in said stripping means, and means for controlling the rate at which the hydrocarbon product flows into said stripping means according to the level of liquid sensed in said stripper means.

References Cited by the Examiner
UNITED STATES PATENTS

| | | | |
|---|---|---|---|
| 1,952,639 | 3/1934 | Thiele | 208—355 |
| 2,073,446 | 3/1937 | Ellsberg | 208—355 |
| 2,105,874 | 1/1938 | Aldridge et al. | 208—355 |
| 3,160,582 | 12/1964 | Cabbage | 202—160 |

DELBERT E. GANTZ, *Primary Examiner.*

H. LEVINE, *Assistant Examiner.*